US006887826B2

(12) United States Patent
Nishimura et al.

(10) Patent No.: US 6,887,826 B2
(45) Date of Patent: May 3, 2005

(54) EXHAUST GAS PURIFYING FILTER AND METHOD OF MANUFACTURING THE SAME

(75) Inventors: Mamoru Nishimura, Nagoya (JP); Mikio Ishihara, Kariya (JP); Yoshitsugu Ogura, Toyota (JP)

(73) Assignees: Denso Corporation, Aichi-Pref. (JP); Toyota Jidosha Kabushiki Kaisha, Aichi-ken (JP)

( * ) Notice: Subject to any disclaimer, the term of this patent is extended or adjusted under 35 U.S.C. 154(b) by 253 days.

(21) Appl. No.: 10/156,062

(22) Filed: May 29, 2002

(65) Prior Publication Data

US 2002/0198104 A1 Dec. 26, 2002

(30) Foreign Application Priority Data

May 30, 2001 (JP) ....................................... 2001-162664

(51) Int. Cl.[7] ................................................ B01J 21/00
(52) U.S. Cl. .............................. 502/527.19; 502/527.23
(58) Field of Search ........................ 502/527.19, 527.23

(56) References Cited

U.S. PATENT DOCUMENTS

| | | | | |
|---|---|---|---|---|
| 4,632,683 A | | 12/1986 | Fukutani et al. | |
| 5,069,697 A | * | 12/1991 | Hamaguchi et al. | 55/523 |
| 5,938,992 A | * | 8/1999 | Hamanaka et al. | 264/43 |
| 6,291,379 B1 | * | 9/2001 | Noguchi et al. | 501/118 |

FOREIGN PATENT DOCUMENTS

| | | |
|---|---|---|
| DE | 44 29 009 | 3/1996 |
| EP | 0 250 166 | 12/1987 |
| EP | 0 736 503 | 10/1996 |
| EP | 0 834 343 | 4/1998 |
| EP | 1 125 704 | 8/2001 |
| EP | 1 245 262 | 10/2002 |
| JP | B-3-10365 | 2/1991 |
| JP | A-9-77573 | 3/1997 |
| JP | A-9-220423 | 8/1997 |
| JP | A-9-313849 | 12/1997 |
| JP | A-10-59784 | 3/1998 |

* cited by examiner

*Primary Examiner*—Stanley S. Silverman
*Assistant Examiner*—Jonas N. Strickland
(74) *Attorney, Agent, or Firm*—Nixon & Vanderhye P.C.

(57) ABSTRACT

The present invention provides an exhaust gas purifying filter that has an increased contact area, between a catalyst supported on the dividing walls of a honeycomb structural body and particulate matter deposited thereon, and can improve the capacity of the catalyst to oxidize the particulate matter, and a method of manufacturing the same.

According to the present invention, the exhaust gas purifying filter 1 comprising the honeycomb structural body 10 made of ceramic and the catalyst 2 supported on the surface of the dividing walls 11 of the honeycomb structural body 10 has void ratio, of the dividing wall 11 of the honeycomb structural body 10, in a range from 55 to 80%, and the proportion of surface pores is 20% or higher.

7 Claims, 2 Drawing Sheets

EXHAUST GAS PURIFYING FILTER AND METHOD OF MANUFACTURING THE SAME

BACKGROUND OF THE INVENTION

1. Field of the Invention

The present invention relates to an exhaust gas purifying filter that collects particulate matter, such as fine carbon particles emitted from internal combustion engines, and oxidizes and removes the particulate matter by a catalytic reaction, and to a method of manufacturing the same.

2. Description of the Related Art

For the purification of particulate matter emitted from an internal combustion engine, a method has been conceived where an exhaust gas purifying filter is used to collect the particulate matter and the particulate matter is burned and removed by a heater that is disposed at a proper position.

The exhaust gas purifying filters used for this method include the one, for example, that is described in Japanese Unexamined Patent Publication (Kokai) No. 9-77573 and has regulated diameters of the pores included in the surface of dividing walls of honeycomb structural body, made of ceramic, that constitutes the exhaust gas purifying filter, in order to improve the efficiency of capturing the particulate matter on the dividing wall surface.

Regarding the operating principle of the exhaust gas purifying filter, it has been recently proposed to coat the dividing wall surface the honeycomb structural body with a catalyst and continuously burn the particulate matter using a catalytic reaction.

However, when a honeycomb structural body similar to that used for burning and removing the particulate matter by means of the heater as in the prior art is used, there is a problem that the particulate matter cannot be sufficiently burned and removed by the catalyst reaction, for practical use, simply by replacing the heater with the catalyst.

SUMMARY OF THE INVENTION

The present invention has been made in consideration of the problems of the prior art described above, and an object thereof is to provide an exhaust gas purifying filter that has an increased contact area between the catalyst supported on the dividing walls of the honeycomb structural body and the particulate matter deposited thereon, and can increase the capacity of the catalyst to oxidize the particulate matter, and a method of manufacturing the same.

A first aspect of the invention is an exhaust gas purifying filter that comprises a honeycomb structural body made of ceramics and a catalyst supported on the dividing wall surface of the honeycomb structural body, wherein void ratio of the dividing wall of the honeycomb structural body is from 55 to 80%, and the proportion of surface pores is 20% or higher.

The exhaust gas purifying filter of the present invention is characterized in that the void ratio of the dividing wall of the honeycomb structural body is within the particular range described above, and the proportion of surface pores in the dividing walls is 20% or higher. The proportion of surface pores is given by $(B/A)\times100(\%)$, with A representing the total surface area and B representing the sum of pore opening areas, determined through observation of the dividing wall surface by, for example, SEM photography of the dividing wall surface.

According to the present invention, useful irregularities can be formed on the dividing wall surface by setting the proportion of surface pores 20% or higher. As the surface area of the dividing walls whereon the catalyst is supported is increased, a contact area between the catalyst supported on the dividing walls of the honeycomb structural body and the particulate matter deposited thereon increases. This makes the catalyst supported on the dividing walls fully available, thereby improving the capacity of the catalyst to oxidize (burn and remove) the particulate matter. Also, because the surface area of the dividing walls is increased, the effect of reducing the pressure loss can be achieved when the exhaust gas passes through the dividing walls.

The void ratio of the dividing walls of the honeycomb structural body is also controlled to within the particular range described above. This enables it to maintain the proper level of porosity while maintaining the required strength of the entire dividing walls.

According to the present invention, as a result, the capacity to burn the particulate matter can be improved and the pressure loss can be reduced by increasing the proportion of surface pores, while maintaining the strength of the dividing walls and other conditions at an optimum level by setting the void ratio as described above.

A second aspect of the present invention is a method of manufacturing the exhaust gas purifying filter that comprises the honeycomb structural body made of ceramic and the catalyst supported on the dividing wall surface of the honeycomb structural body, characterized in that the honeycomb structural body is made by forming a ceramic molding of a honeycomb shape, coating the dividing wall surface of the ceramic molding with a reaction promoting agent before or after drying the ceramic molding, and then firing the ceramic molding, thereby to increase the proportion of surface pores of the dividing walls of the honeycomb structural body.

According to the invention, the dividing wall surface of the ceramic molding of honeycomb shape is coated with the reaction promoting agent before firing the honeycomb structural body made of ceramics that constitutes the exhaust gas purifying filter. The reaction promoting agent refers to a material that accelerates the reaction during firing, and has a function of creating fine pores in the dividing wall surface by decreasing the temperature at which cordierite is generated.

The dividing walls coated with the reaction promoting agent have more pores than would be present if only the pores included in the dividing wall appeared to open on the surface, due to the pores generated by the reaction promoting agent during firing. Therefore, the proportion of surface pores can be increased independently of the control of the void ratio in the dividing walls. Thus the proportion of surface pores can be increased by coating with the reaction promoting agent, while maintaining proper strength of the dividing walls and proper porosity, by controlling the void ratio of the dividing walls through the adjustment of, for example, the mixing proportions of the ceramic materials.

The increase in the proportion of surface pores of the honeycomb structural body made as described above results in more useful surface irregularities than in the prior art. Thus, as the surface area of the dividing walls whereon the catalyst is supported is increased, an increase in the pressure loss when the exhaust gas passes can be suppressed while increasing the contact area between the catalyst supported on the dividing walls of the honeycomb structural body and the particulate matter deposited thereon at the same time. As a result, an exhaust gas purifying filter can be made that can make full use of the action of the catalyst supported on the dividing walls and the capacity of the catalyst to oxidize (burn and remove) the particulate matter can be improved.

A third aspect of the invention is a method of manufacturing the exhaust gas purifying filter that comprises the honeycomb structural body made of ceramic and the catalyst supported on the dividing wall surface of the honeycomb structural body, characterized in that the honeycomb structural body is made by forming the ceramic molding of honeycomb shape, drying and firing the honeycomb molding, and further applying mechanical impact to the dividing wall surface to thereby increase the proportion of surface pores.

According to the invention, the mechanical impact is applied to the surface of the dividing walls after firing, during the manufacture of the honeycomb structural body made of ceramic that constitutes the exhaust gas purifying filter Thus the proportion of surface pores is increased through roughening of the dividing wall surface. This also creates useful irregularities on the dividing wall surface of the honeycomb structural body. As the surface area of the dividing walls that support the catalyst is increased, an increase in the pressure loss when the exhaust gas passes can be suppressed and the contact area between the catalyst supported on the dividing walls of the honeycomb structural body and the particulate matter deposited thereon can be increased. As a result, such an exhaust gas purifying filter can be made that allows it to make full use of the action of the catalyst that is supported on the dividing walls and the capacity of the catalyst to oxidize (burn and remove) the particulate matter can be improved.

DETAILED DESCRIPTION OF THE PREFERRED EMBODIMENTS

Figure 1:
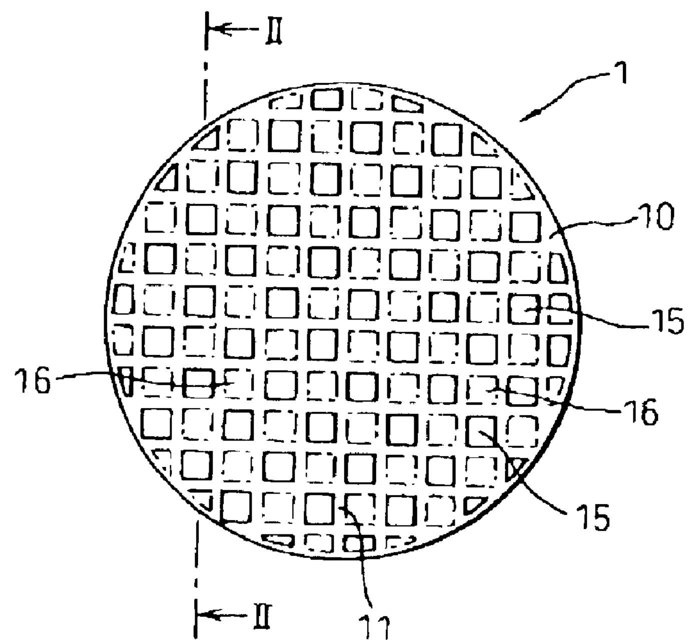
FIG. 1 is a front view of an exhaust gas purifying filter of Example 1 of the invention.

In the first aspect of the invention, the catalyst is supported on the dividing wall surface of the honeycomb structural body. The catalyst may be, for example, Pt or Pd. These materials have the effect of lowering the burning temperature of the particulate matter so as to make it easier to burn, and improving the reactivity of the particulate matter through a catalytic reaction with the NOx and the particulate matter.

The void ratio in the dividing walls of the honeycomb structural body is set in a range from 55 to 80%. When the void ratio is less than 55%, the pressure loss when the exhaust gas passes through the dividing walls becomes too high. When the void ratio is higher than 80%, on the other hand, strength of the dividing walls decreases.

The proportion of surface pores is set to 20% or higher, as described above. When the proportion of surface pores is less than 20%, an improvement cannot be expected in the contact area between the catalyst and the particulate matter, and in the catalytic action, through the increase in the surface area of the dividing walls.

For this reason, the proportion of surface pores in the dividing walls is preferably 25% or higher. This ensures the improvement of the catalyst action.

The honeycomb structural body is preferably made of a ceramic that includes cordierite as the main component. Cordierite has a strength and a coefficient of thermal expansion that are suited to a catalyst support of the exhaust gas purifying filter, and make it possible to control the void ratio and other parameters relatively easily.

The dividing walls of the honeycomb structural body is preferably formed in undulated shape with an irregular surface, which increases the surface area of the dividing walls. Moreover, the capacity of the catalyst to oxidize the particulate matter can be improved.

In the second aspect of the invention, the ceramic molding is coated with the reaction promoting agent either immediately after molding process or after drying.

The quantity and the components of the reaction promoting agent used in the coating are determined according to the proportion of surface pores to be achieved.

It is preferable that the honeycomb structural body is made of a ceramic that includes cordierite as the main component, and the reaction promoting agent is talc. As described above, cordierite is suitably used for the honeycomb structural body of the exhaust gas purifying filter and, if cordierite is used, it is preferable to use talc as the reaction promoting agent.

Talc is a clay mineral that includes MgO and $SiO_2$ as the main components. Cordierite is a ceramic material that includes $MgO.SiO_2.Al_2O_3$. Use of talc as the reaction promoting agent makes the portion of the ceramic that is in contact with the reaction promoting agent lean in the $Al_2O_3$ content with a lowered melting point. As the result, the portion of the ceramics in contact with the reaction promoting agent partially melts during the firing process so that pores are generated, thereby easily increasing the proportion of surface pores.

According to third aspect of the invention, the mechanical impact can be applied by, for example, putting steel balls or ceramic pieces of particle sizes in a range from 100 to 500 $\mu$m in the filter and, with the apertures of the filter being closed, the filter is vibrated so that microscopic fractures are caused on the surface.

In the manufacturing method according to the second and third aspects of the invention, when the ceramic molding of honeycomb shape is formed by extrusion molding, such a die that has grooves formed in the shape of a honeycomb with the grooves having undulated configuration of irregular surface is used, so as to form the dividing walls of the honeycomb structural body in undulated configuration that has irregular surface. In this case, the entire shape of the dividing walls become convenient for increasing the surface area, thereby making it possible to increase the proportion of surface pores and improve the capacity of the catalyst to oxidize the particulate matter and the effect of suppressing the increase in the pressure loss.

Example 1

The exhaust gas purifying filter according to the example of the invention and the method of manufacturing the same will be described below with reference to FIG. 1 and FIG. 2.

Figure 2:
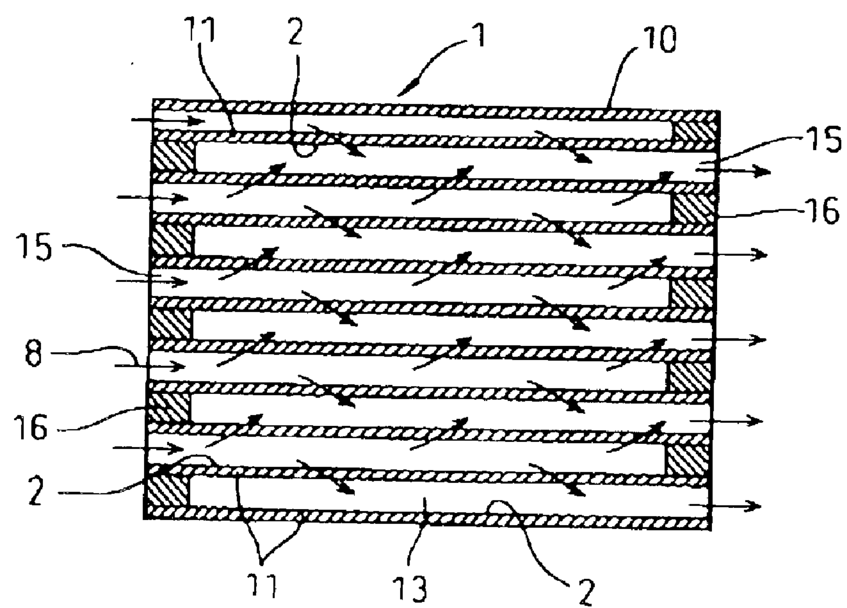
FIG. 2 is a sectional view of Example 1 taken along lines II—II in FIG. 1.

The exhaust gas purifying filter of this example comprises a honeycomb structural body 10 made of ceramic and a catalyst 2 supported on the surfaces of dividing walls 11 of the honeycomb structural body 10 as shown in FIG. 1 and FIG. 2. Void ratio of the dividing walls 11 of the honeycomb structural body 10 is in a range from 55 to 80%, and proportion of surface pores is 20% or higher.

The honeycomb structural body 10 was manufactured by first forming a ceramic molding of honeycomb shape by extrusion molding. For the ceramic materials, talc, fused silica and aluminum hydroxide were used by mixing in proportions of 45 to 55% by weight of $SiO_2$, 33 to 42% by weight of $Al_2O_3$, and 12 to 18% by weight of MgO, so as to obtain cordierite. These ceramic materials were mixed with an organic combustible material used as a foaming agent, carbon and water, and the mixture was subjected to extrusion molding.

Extrusion molding process was carried out by using a die having grooves of rectangular grid configuration. The ceramic molding of honeycomb shape (honeycomb structural body) having 300 cells was extrusion molded and cut into desired lengths.

Then the honeycomb structural body was dried and was coated with the reaction promoting agent on the surface of the dividing walls 11.

In this example, talc including 31.8% of MgO and 62% of $SiO_2$ prepared to have particle size of about 15 $\mu$m was used as the reaction promoting agent, after being put into water in a predetermined concentration.

The coating was applied by the dipping process wherein the honeycomb structural body 10 was immersed in a talc bath prepared in the predetermined concentration.

Then the honeycomb structural body coated with the reaction promoting agent was fired at 1,400° C. for a period of 5 hours, thereby to obtain the honeycomb structural body 10 as the catalyst support.

In this example, as the honeycomb structural body was fired in the state of being coated with talc serving as the reaction promoting agent, dividing walls 11 have more pores than would be present if only the pores included in the dividing walls appeared to open on the surface, due to the amount of pores generated by the reaction promoting agent during firing.

In this example, void ratio, mean pore size and proportion of surface pores of the dividing walls 11 of the honeycomb structural body 10 were measured.

Void ratio and mean pore size were measured using a SEM mercury porosimeter. The proportion of surface pores was measured by image processing a SEM photograph of the dividing wall surface. Measured values are 58% for the void ratio of the honeycomb structural body 10, 25 $\mu$m for the mean particle size and 35% for the proportion of surface pores.

Also in this example, as shown in FIG. 1 and FIG. 2, at the opening portions of the cells on both ends of the honeycomb structural body 10, open portions 15 and portions closed with plugs 16 are arranged in a checker work pattern. On both end faces, the checker work patterns are staggered with each other, so that one end of the cell 13 is closed and the other end is left open.

Then catalyst 2 made of Pt is supported on the dividing walls of the honeycomb structural body 10 thereby completing the exhaust gas purifying filter 1.

The exhaust gas purifying filter 1 is housed in a casing and is installed in an exhaust passage of an internal combustion engine. Exhaust gas 8 from the internal combustion engine enters the exhaust gas purifying filter 1 through the open ends of the cells, passes through the dividing walls 11 and is discharged to the outside, as shown in FIG. 2.

The particulate matter included in the exhaust gas 8 is captured on the dividing walls 11.

In the exhaust gas purifying filter 1 of this example, surface of the dividing walls 11 is given useful irregularities by setting the proportion of surface pores of the dividing walls 11 of the honeycomb structural body 10 that supports the catalyst to 35% (not less than 20%) as described above.

As a result, the surface area of the dividing walls 11 whereon the catalyst 2 is supported is increased, and the contact area between the particulate matter deposited on the dividing walls of the honeycomb structural body and the catalyst supported thereon can be increased. This puts the catalyst 2 supported on the dividing walls 11 into full play, thereby improving the capacity of the catalyst to oxidize (burn and remove) the particulate matter. Also, because the surface area of the dividing walls 11 is increased, an increase in the pressure loss can be reduced when the exhaust gas 8 passes through the dividing walls.

The void ratio of the dividing walls 11 of the honeycomb structural body 10 is set to 58%, so that strength of the dividing walls 11 and the pressure loss when the exhaust gas 8 passes through the dividing walls are maintained at proper levels.

Also, according to the method of manufacturing the exhaust gas purifying filter 1 in this example, the honeycomb structural body 10 is made by forming a ceramic molding of honeycomb shape, coating the dividing wall surface of the ceramic molding with the reaction promoting agent after drying the ceramic molding, and then firing the ceramic molding. This results in an increase in the proportion of surface pores of the dividing walls 11 of the honeycomb structural body 10.

Use of this method in this example makes it possible to easily increase the proportion of surface pores and to obtain the exhaust gas purifying filter 1 that has the high performance described above.

Example 2

In this example, a plurality of exhaust gas purifying filters that are similar to that of Example 1 but have different proportion of surface pores are produced and compared by measuring the pressure loss thereof.

The exhaust gas purifying filters produced have four values of proportion of surface pores; 17.2%, 20.2%, 23.2% and 25.0%. Void ratio and other characteristics are made substantially similar to those of Example 1.

Pressure loss was determined by measuring the difference between pressures at the front and back ends of the filter while passing compressed air through the filter at a flow rate of 2 $m^3$/min.

Figure 3:
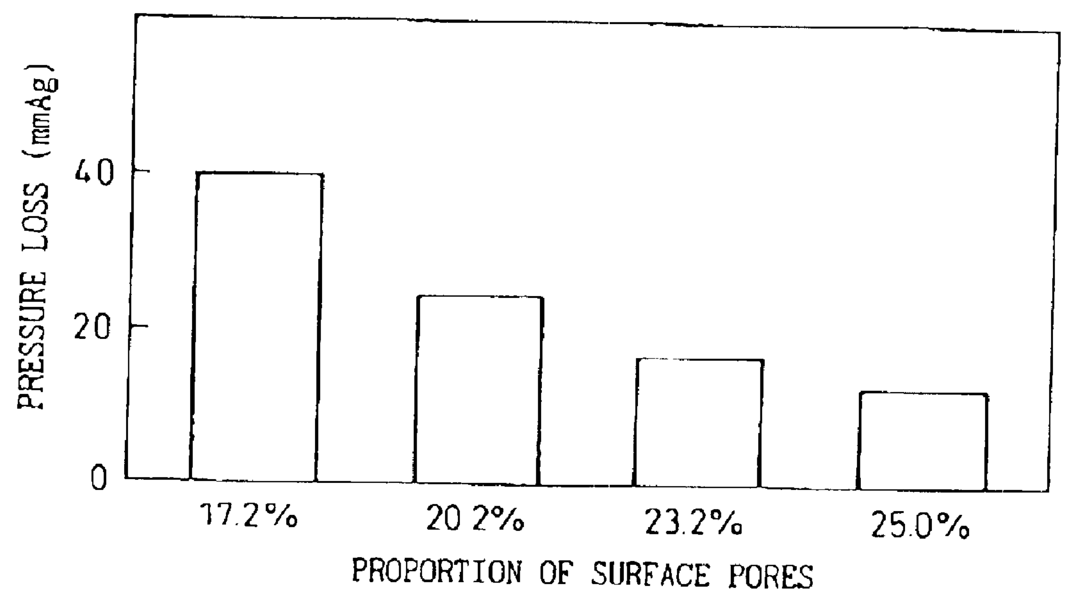
FIG. 3 shows the relation between the proportion of surface pores and pressure loss according to Example 2.

Results of the measurements are shown in FIG. 3 where proportion of surface pores (%) is plotted along the abscissa and pressure loss (mmAg) is plotted along the ordinate.

This graph shows that the pressure loss decreases as the proportion of surface pores increases, with the effect particularly conspicuous when the proportion of surface pores is higher than 20%.

Example 3

In this example, the exhaust gas purifying filter of Example 1 (referred to as Example E1) and an exhaust gas purifying filter made for comparison (referred to as Comparative Example C1) were prepared and compared for the characteristics thereof.

Example E1 has void ratio of 58%, mean particle size of 25 $\mu$m and proportion of surface pores of 35% as shown in Table 1.

Comparative Example C1 was produced similarly to the manufacturing method of Example 1, except for omitting the process of coating with the reaction promoting agent Comparative Example C1 has void ratio of 58%, mean particle size of 25 μm and proportion of surface pores of 17.7.% as shown in Table 1.

The particulate matter capturing efficiency and particulate matter burning rate were measured on Example E1 and Comparative Example C1 The particulate matter capturing efficiency was measured as follows. A predetermined quantity of light oil is burned incompletely, and the particulate matter generated and air (2 $m^3$/min) are caused to flow through the filter. The quantity of particulate matter that has passed through the filter is measured by placing a filter paper at the back end of the filter, and the capturing efficiency is determined as the ratio of the quantity of particulate matter captured in the filter to the total quantity of particulate matter.

The particulate matter burning rate was measured by checking the burning state of the particulate matter when the sample, after measuring the capturing efficiency, was heated to a predetermined temperature (400° C.) in the exhaust gas.

Results of these measurements are shown in Table 1.

TABLE 1

| | Void ratio | Mean pore size | Proportion of surface pores | Capturing efficiency | Particulate matter burning rate |
|---|---|---|---|---|---|
| Example E1 | 58% | 25 μm | 35.00% | 95% | High (good) |
| Comparative Example C1 | 58% | 25 μm | 17.70% | 95% | Slow |

As will be seen from Table 1, Example E1, that is the example of the present invention, has a very high particulate matter burning rate, indicating high performance of the exhaust gas purifying filter.

Particulate matter capturing efficiency was at similar levels in Example E1 and Comparative Example C1.

This result shows that increasing the proportion of surface pores can improve the capacity of the catalyst to oxidize (burn and remove) the particulate matter and is very effective for the exhaust gas purifying filter.

Example 4

Figure 4:
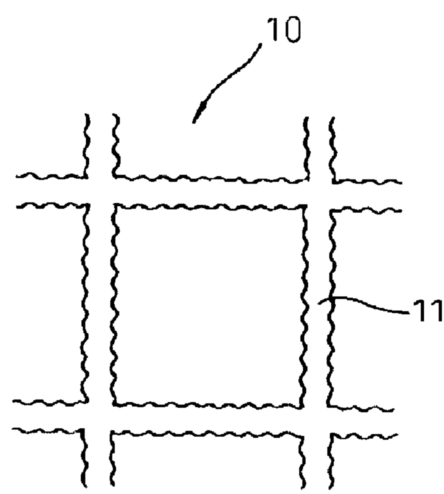
FIG. 4 shows the dividing wall configuration of a honeycomb structural body of Example 4 of the invention.

In this example, a die that had grooves formed in the shape of honeycomb, with the grooves having undulated configuration of irregular surface, was used when molding the honeycomb structural body 10 of Example 1 by extrusion molding Thus the honeycomb structural body 10 is made with the surface of the dividing walls 11 formed in undulated configuration having surface irregularities as shown in FIG. 4.

In this case, the dividing walls 11 have such an entire configuration as the surface area is increased. Thus surface area of the dividing walls 11 can be increased further, making it possible to further improve the capacity of the catalyst to oxidize the particulate matter.

In other respects, operation and effects similar to those of Example 1 can be achieved.

What is claimed is:

1. An exhaust gas purifying filter comprising a honeycomb structural body made of ceramic and a catalyst supported on the dividing wall surface of said honeycomb structural body, wherein the void ratio of said dividing walls of said honeycomb structural body is in a range from 55 to 80%, and the proportion of surface pores is 20% or higher.

2. The exhaust gas purifying filter according to claim 1, wherein said honeycomb structural body is made of a ceramic including cordierite as the main component.

3. The exhaust gas purifying filter according to claim 2, wherein said dividing walls of said honeycomb structural body are made in undulated configuration having surface irregularities.

4. The exhaust gas purifying filter according to claim 1, wherein said dividing walls of said honeycomb structural body are made in undulated configuration having surface irregularities.

5. The exhaust gas purifying filter comprising a honeycomb structural body made of ceramic and a catalayst supported on the dividing wall surface of said honeycomb structural body, wherein the void ratio of said dividing walls of said honeycomb structural body is in a range from 55% to 80%, and the proportion of said surface pores of dividing walls of said honeycomb structural body is 25% or higher.

6. The exhaust gas purifying filter according to claim 5, wherein said honeycomb structural body is made of a ceramic including cordierite as the main component.

7. The exhaust gas purifying filter according to claim 5, wherein said dividing walls of said honeycomb structural body are made in undulated configuration having surface irregularities.

* * * * *